United States Patent
Newton

(10) Patent No.: US 10,334,791 B2
(45) Date of Patent: Jul. 2, 2019

(54) CONTAINER SYSTEMS AND METHODS FOR CONTROLLING PLANT GROWTH

(71) Applicants: Michael Newton, Laguna Niguel, CA (US); Alan Newton, Laguna Niguel, CA (US); Cheryl Newton, Laguna Niguel, CA (US)

(72) Inventor: Michael Newton, Laguna Niguel, CA (US)

(73) Assignees: Michael Newton, Laguna Niguel, CA (US); Alan Newton, Laguna Niguel, CA (US); Cheryl Newton, Laguna Niguel, CA (US)

( * ) Notice: Subject to any disclaimer, the term of this patent is extended or adjusted under 35 U.S.C. 154(b) by 235 days.

(21) Appl. No.: 15/195,795

(22) Filed: Jun. 28, 2016

(65) Prior Publication Data
US 2017/0064910 A1    Mar. 9, 2017

Related U.S. Application Data

(60) Provisional application No. 62/215,342, filed on Sep. 8, 2015.

(51) Int. Cl.
*A01G 9/12* (2006.01)
*A01G 9/02* (2018.01)

(52) U.S. Cl.
CPC .............. *A01G 9/12* (2013.01); *A01G 9/028* (2013.01)

(58) Field of Classification Search
CPC .................. A01G 9/12; A01G 9/028
See application file for complete search history.

(56) References Cited

U.S. PATENT DOCUMENTS

| | | | |
|---|---|---|---|
| 4,344,251 A | 8/1982 | Edling | |
| 5,276,996 A * | 1/1994 | Lee | A01G 9/12 47/45 |
| 5,769,996 A | 6/1998 | McArdle et al. | |
| 6,536,159 B1 | 3/2003 | Van Den Ende | |
| 6,986,224 B2 | 1/2006 | Gelfer | |
| 2002/0088177 A1 | 7/2002 | Gergek | |
| 2005/0252080 A1 | 11/2005 | Wright | |
| 2014/0083007 A1 | 3/2014 | Galvan | |

FOREIGN PATENT DOCUMENTS

| | | | |
|---|---|---|---|
| FR | 2753341 A1 | 3/1998 | |
| WO | WO 2017/044489 A1 | 3/2017 | |

OTHER PUBLICATIONS

International Search Report & Written Opinion, dated Jan. 19, 2017, in International Application No. PCT/US2016/050556.

* cited by examiner

*Primary Examiner* — Monica L Williams
(74) *Attorney, Agent, or Firm* — Knobbe, Martens, Olson & Bear, LLP

(57) ABSTRACT

Container systems for manipulating growth of a plant or a portion thereof in a controlled environment are provided. The growth of the plant can be controlled for ornamental benefit, commercial benefit or both. The container system may comprise separable modular sections, thereby allowing control over the growth of different parts of the plant. The separate modular sections may be assembled together to control the growth of the entire plant.

13 Claims, 13 Drawing Sheets

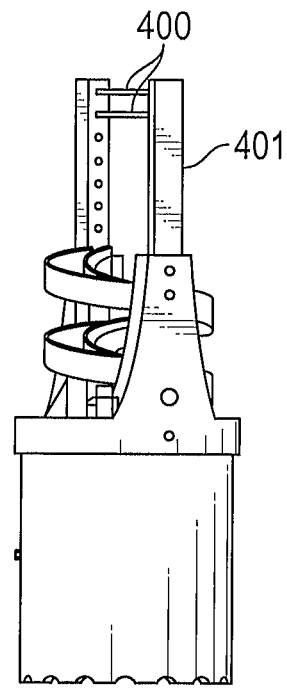
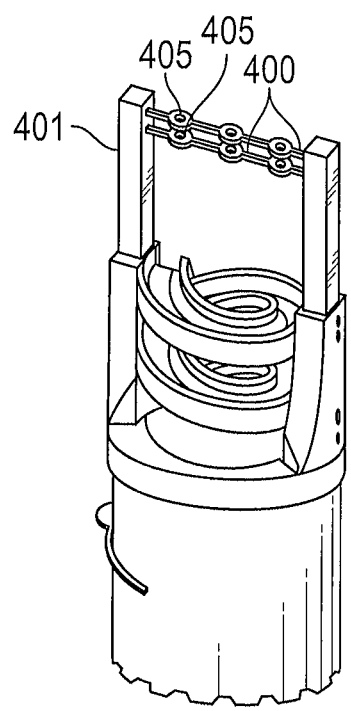
FIG. 4E  FIG. 4F
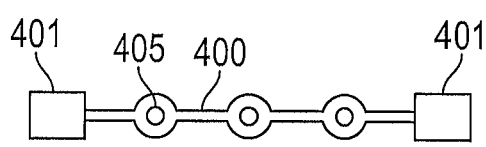
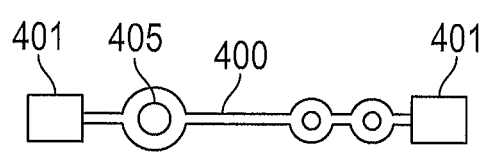
FIG. 4G  FIG. 4H
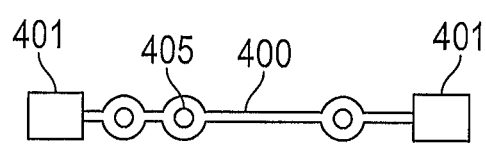
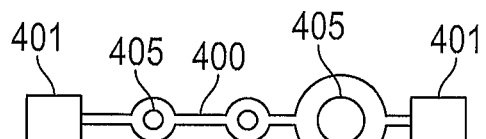
FIG. 4I  FIG. 4J

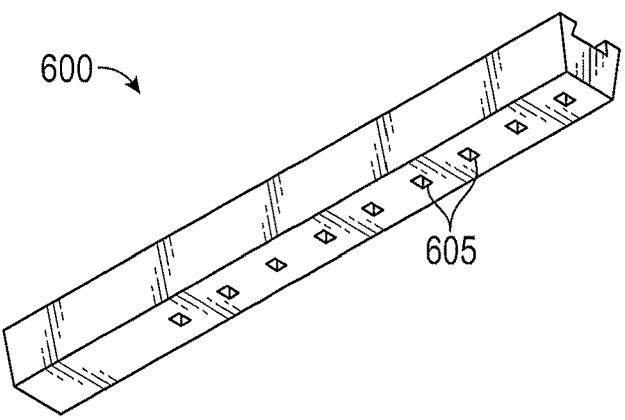
FIG. 6A
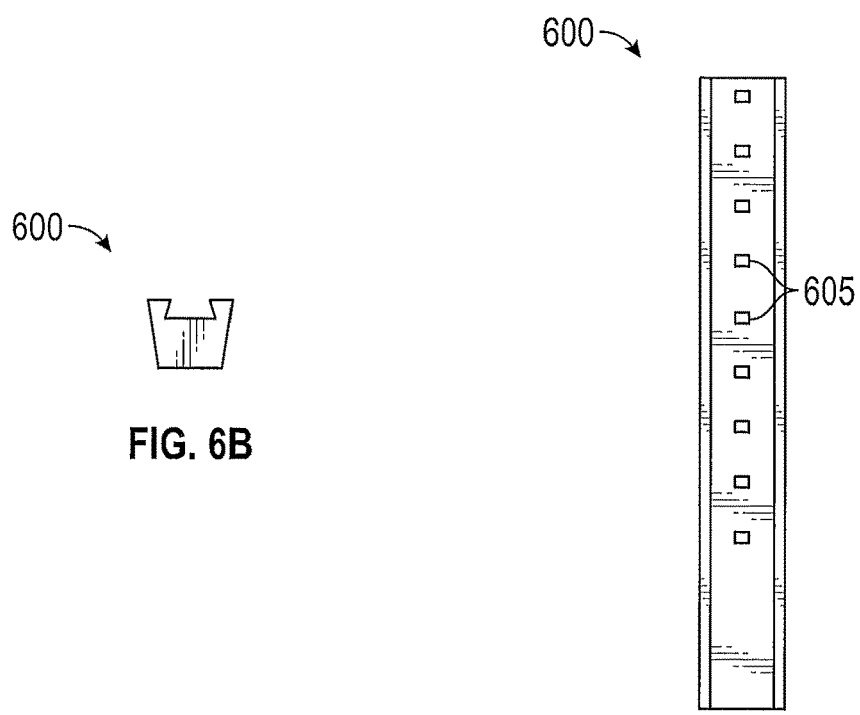
FIG. 6B
FIG. 6C
FIG. 6D

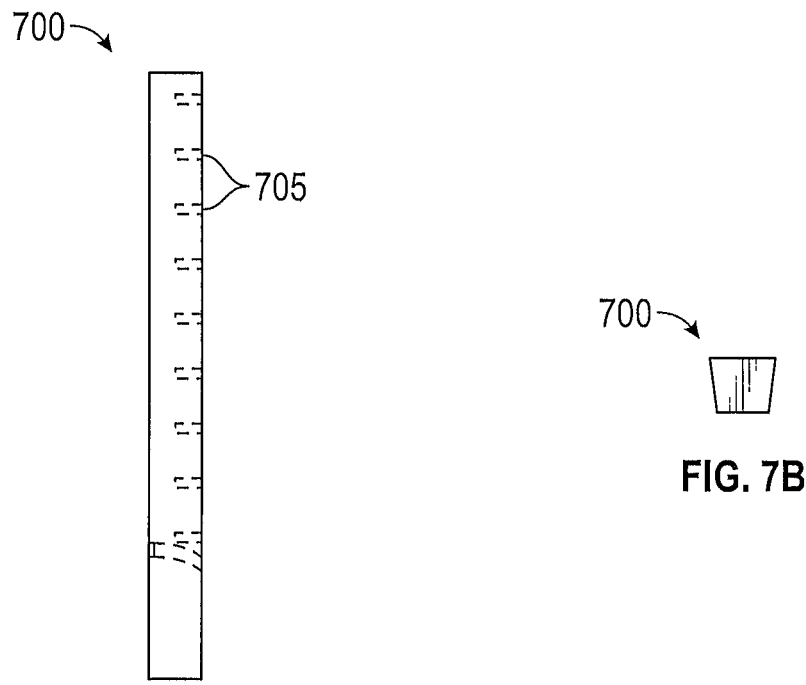
FIG. 7A
FIG. 7B
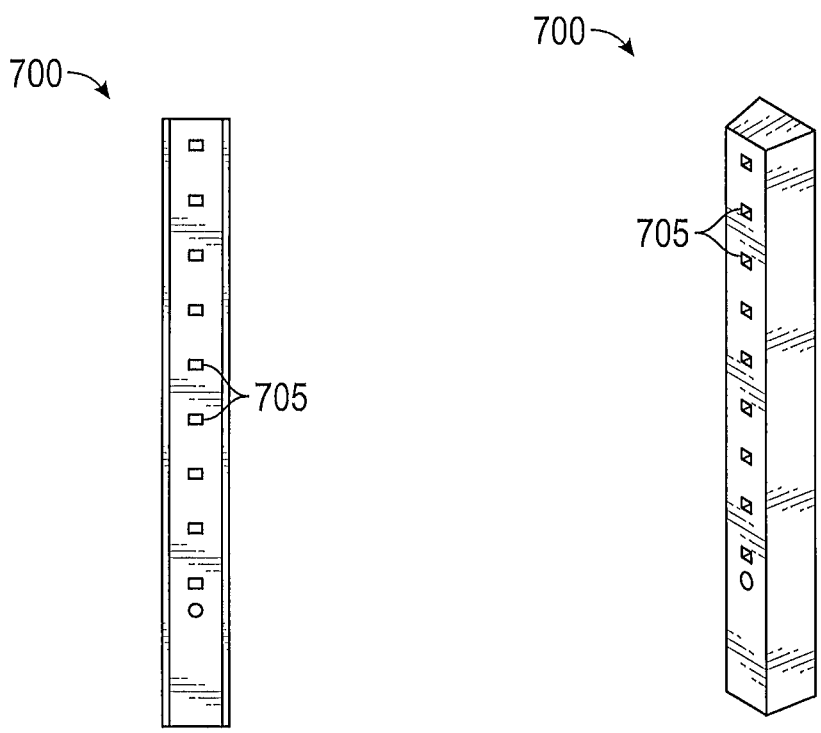
FIG. 7C
FIG. 7D

US 10,334,791 B2

CONTAINER SYSTEMS AND METHODS FOR CONTROLLING PLANT GROWTH

CROSS-REFERENCE TO RELATED APPLICATIONS

This application claims the benefit of U.S. Provisional Application 62/215,342 filed on Sep. 8, 2015, which is hereby incorporated by reference in its entirety.

FIELD

The present disclosure relates generally to apparatuses and methods for growing plants in a controlled environment.

SUMMARY

In one aspect, container systems for the growth of one or more plants are provided. In some embodiments, a container system comprises a bottom section configured to accommodate and control the growth of a root part of the plant, a middle section configured to accommodate and guide the growth of a stem part of the plant, and a top section configured to guide the growth of a vegetative part, a reproductive part or both of the plant.

In some embodiments of the container system, the bottom section has a cylindrical shape with an internal space. In some embodiments of the container system, the bottom section is configured to control the growth of the root part of the plant by providing a defined volume available for root growth within the hollow internal space. In some embodiments of the container system, the middle section comprises a spiral part with a spiral shape, wherein the spiral part has a set of removable wall pieces. The set of removable wall pieces can be bonded together to form a spiral tunnel. The spiral tunnel may guide the growth of the stem part of one or more plants, for example along a spiral route. The spiral part may shield at least a portion of the stem part from a light source. In some embodiments of the container system, the light source is at least one of an artificial light source or a natural light source.

In some embodiments of the container system, the top section may comprise one or more restraints for plant stems. The restraints may guide the growth of the vegetative part of a plant, the reproductive part or both parts, wherein the vegetative part comprises leaves, and the reproductive part comprises buds, flowers, fruits or a combination thereof.

In some aspects, methods of growing one or more plants are provided. In some embodiments, the methods comprise providing a container system comprising a bottom section having a removable water permeable barrier partitioning the bottom section into at least two volumes, growing the root part of the plant within a first of the two volumes for a first duration of time, removing the removable water permeable barrier to form a single volume from the original two volumes after the first duration of time, and subsequently growing the root part within the bottom section for a second duration of time. In some embodiments, the container system further comprises a middle section comprising a spiral tunnel, and the method further comprises growing a stem part of the plant within the spiral tunnel. In some embodiments, the method further comprises extending a length of the spiral tunnel as the stem grows. In some embodiments of the method, the container system further comprises a top section comprising one or more restraints for plant parts, such as plant stems, the method further comprising supporting the plant stems with the one or more restraints. In some embodiments of the method, the plant is an ornamental plant. In some embodiments of the method, the ornamental plant is a flowering plant. In some embodiments of the method, the plant is a medicinal plant. In some embodiments of the method, the plant is cannabis.

BRIEF DESCRIPTION OF THE DRAWINGS

FIGS. 4A-4F show various views of an example of the container system of FIGS. 1A-3D including bottom, middle, and top sections for controlling plant growth.

FIGS. 4G-4J show top views of non-limiting embodiments of a horizontal bar and restraints of a container system.

FIGS. 6A-6D show various views of an example of a first locking rail for supporting the middle section of a container system.

FIGS. 7A-7D show various views of an example of a second locking rail for supporting the middle section of a container system.

Figure 1A:
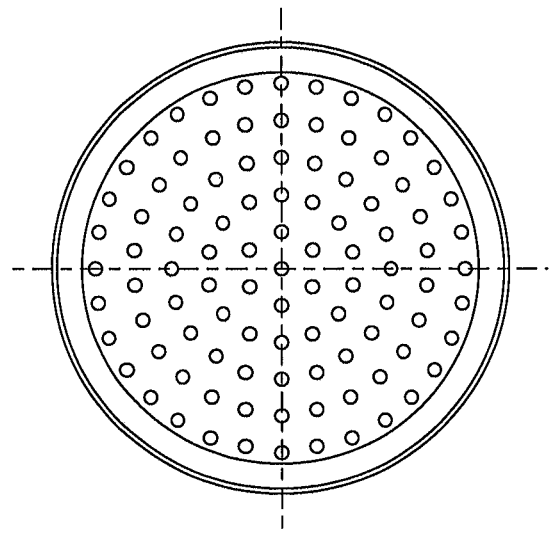
FIGS. 1A-1F show various views of an example of a bottom section of a container system for accommodating plant roots.

The drawings are provided to illustrate example embodiments described herein and are not intended to limit the scope of the disclosure.

DETAILED DESCRIPTION

The cultivation of plants faces the pressures of encouraging the growth of the plants, while maximizing the area occupied by each plant within a growing area. Advantageously, various embodiments of a container system disclosed herein allow for the growth of plants in a controlled manner and in a way that takes advantage of the available space. In addition, in some embodiments, the container system may be utilized to facilitate the subsequent processing of the plants. As a result, in some embodiments, the cultivation of plants may be facilitated by allowing for increases in the amount of plant material in a given growth facility, and by reducing the amount of time and additional materials or equipment needed to process the plants after growth.

In some embodiments, a container provides a controlled environment for a plant to occupy, thereby allowing control over the growth of the plant. In some embodiments, the container system comprises separable modular sections that control the growth of different parts of the plant. The separate modular sections can be assembled together to control the growth of the entire plant. In some embodiments, the separate sections have adjustable components that allow the separate modular sections to be customized to control the level and nature of the growth of the plant.

In some embodiments, the plant may include three parts—a root part, a stem part and a vegetative/reproductive part. The growth of each of these parts is controlled by a different modular section of the container system. Therefore, in some embodiments, the container system comprises at least one of these three sections, and may include two or all three of these sections. From bottom to top, these sections are a bottom section, a middle section, and a top section. In some embodiments, these sections allow for independently controlling the growth of one or more of a root part, a stem part, and a vegetative/reproductive part of the plant. For example, the bottom section can be used to control the growth of the root part. The middle section can be used to control the growth of the stem part. The top section can be used to control the growth of the vegetative/reproductive part.

In some embodiments, the bottom section can be used to control the growth of the root part. In some other embodiments, the bottom and middle section can be used in combination to control the growth of the root and stem parts, respectively. In yet other embodiments, the bottom, middle and top sections can be used in combination to control the growth of an entire plant. For example, the three sections may be fit together such that the bottom section allows for controlling the growth of the root part, the middle section allows for controlling the growth of the stem part, and the top section allows for controlling the growth of the vegetative/reproductive part. In some embodiments, the bottom, middle, and top sections may be used separately, or in any combination of two of these sections.

In some embodiments, the bottom section, middle section, and top section are customizable based on the environment and results desired. For example, the environment provided to the plant by the bottom, middle, and top sections may be adjusted based on the features that are desired in the plant, the method of controlling plant growth, the desired growth outcome, or a combination thereof.

For example, in some plants, root growth is too much, too fast, or both. For such plants, the bottom section can be used to achieve regulated growth of the roots by constraining the volume available for root growth.

Vegetative growth comprises the growth of leaves and branches during which the plant expends resources and accumulated energy reserves. The amount of energy expended during vegetative growth can be substantially reduced by regulating this vegetative growth. For example, energy expenditure can be reduced by controlling plant growth such that vegetative growth is confined to the top end of a stem and does not occur along the length of the stem. The middle section can be used to restrict vegetative growth along a majority of the length of the stem part by shielding the majority of the length from an energy source (e.g., light, including artificial light or sunlight) thus preventing vegetative, fruiting, and/or flowering growth along the majority of the length of the stem part.

Reproductive growth (during the flowering stage of the plants) comprises growth of buds, flowers and fruits and branches comprising the buds, flowers and fruits. Reproductive growth entails consumption and expenditure of significant amount of energy resources e.g., sunlight, water, nutrients, and energy reserves accumulated during vegetative growth. Similar to vegetative growth, the amount of energy expended during reproductive growth can also be substantially reduced by embodiments disclosed herein. For example, energy expenditure can be reduced by controlling plant growth such that reproductive growth occurs only at the top end of a stem and does not occur along the length of the stem.

The top section can be used to guide the vegetative and reproductive growth, for example, the growth of leaves, buds, flowers, and fruits at the top end of the stem. In some embodiments, vegetative and reproductive growth selectively occurs on a part of the stem that is not shielded from an energy source by the middle section.

Reference will now be made to the drawings, in which like numerals refer to like parts throughout. Examples of the bottom, middle, and top sections, and various other features, are described below.

Bottom Section

Figure 1B:
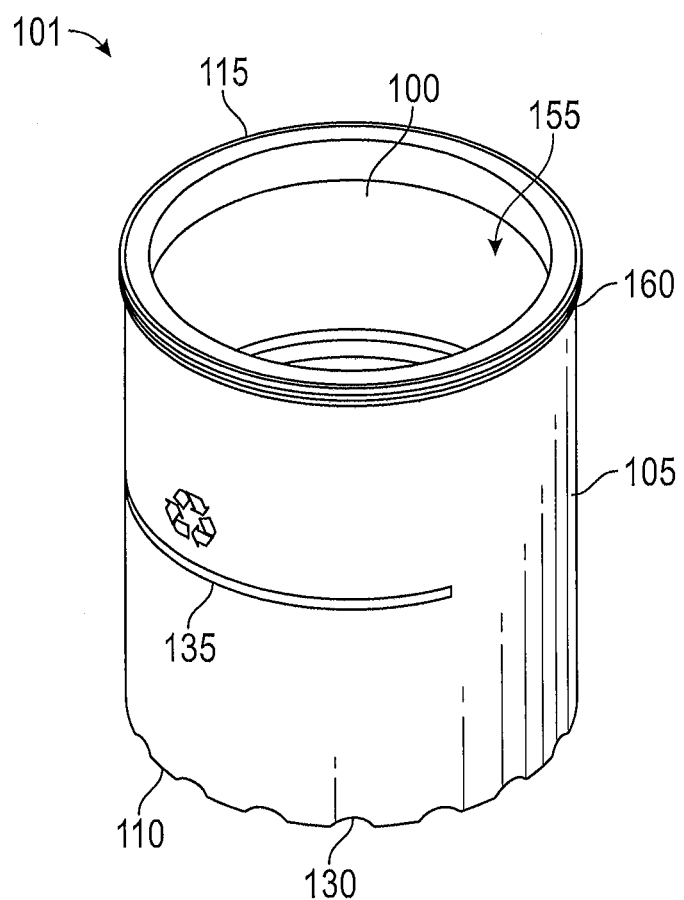
Figure 1C:
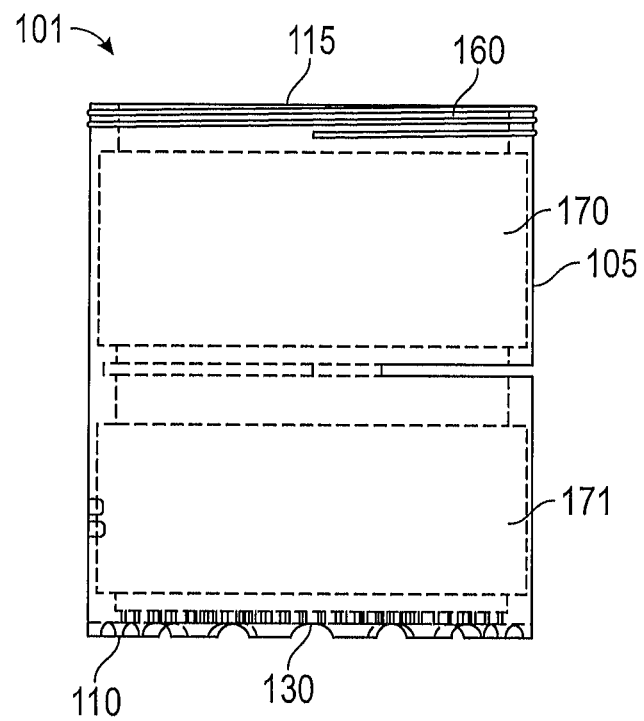
Figure 1D:
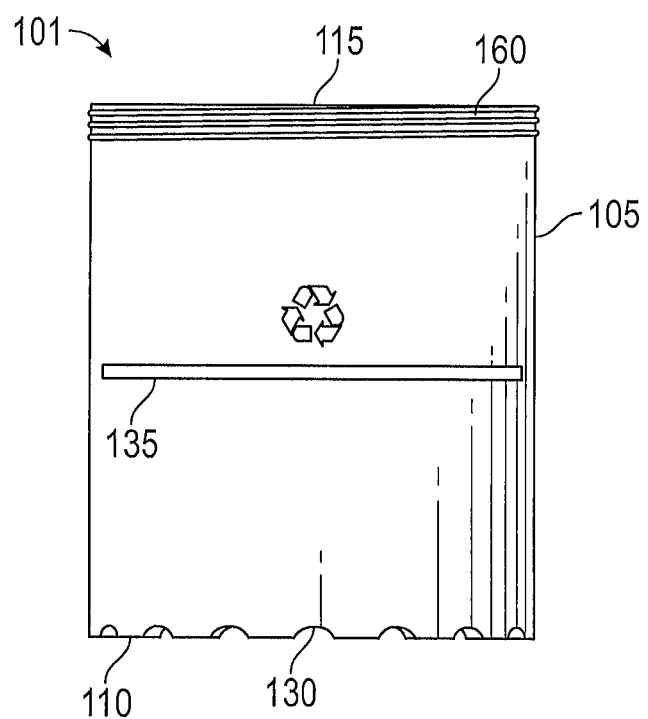
Figure 1E:
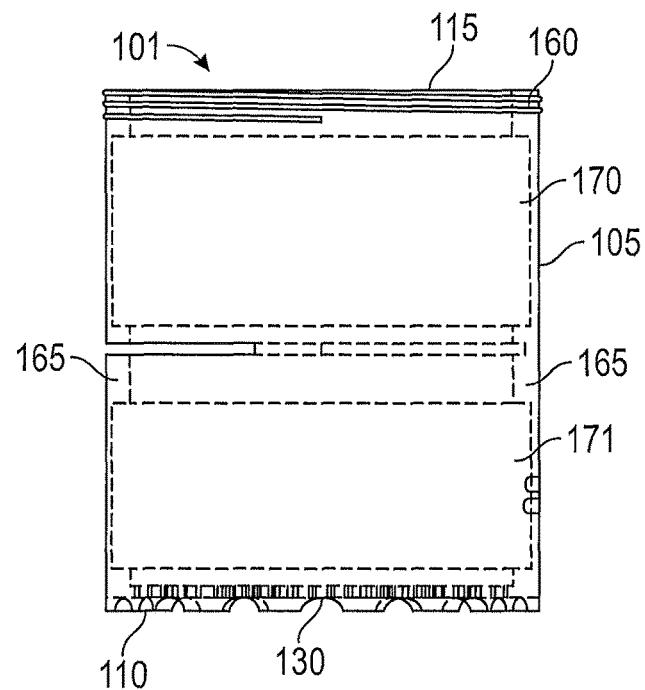
Figure 1F:
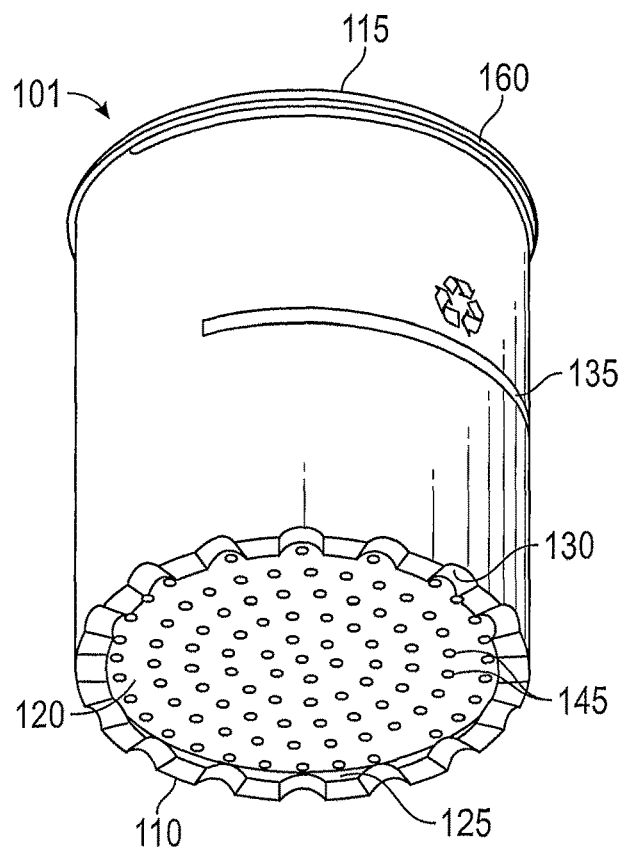

With reference to FIGS. 1A-1F, various views of an example of a bottom section of a container system (101) for accommodating plant roots are illustrated. FIG. 1A illustrates a bottom-up view of a bottom of the bottom section (101). FIG. 1B illustrates a perspective view, looking downwards, of the bottom section (101). FIGS. 1C-1E illustrate side views of the bottom section (101). FIG. 1F illustrates a perspective view, looking upwards, of the bottom section (101).

It will be appreciated that the bottom section is the lowermost section and closest to ground level, and may be a container for a growth medium (e.g., soil) and plant roots in that growth medium. The bottom section (101) may be shaped like a cylinder. In some other embodiments, the bottom section can have other shapes such as a cube, cone, cuboid, or sphere. With reference to FIG. 1B, the bottom section (101) is hollow, and comprises an internal space (155), an interior wall (100) and an exterior wall (105).

In some embodiments, the bottom section (101) has a bottom end (110) and a top end (115). The external wall at the top end has horizontal threading (160). The bottom end (110) is closer to ground level than the top end (115). In some embodiments, the bottom end (110) is fitted with a water permeable bottom barrier (FIG. 1F; 120). The water permeable bottom barrier (120) is near the bottom end (110) of the bottom section (FIG. 1F). In some embodiments, the water permeable bottom barrier (120) is a barrier that serves to support and contain a growing medium and/or a root system of a plant or multiple plants within the bottom section. In some embodiments, a majority of the growing medium and/or the root system of a plant or multiple plants is contained within the bottom section.

In some embodiments, the water permeable bottom barrier has at least one hole, and preferably a plurality of holes. For example, as illustrated in FIG. 1F, the barrier at the bottom could be perforated with a plurality of circular shaped holes (145). The holes can have other shapes such as triangular, square, pentagonal, hexagonal, etc. In some embodiments, the number of holes in the water permeable bottom barrier is about 10 to about 100. In some other embodiments, the water permeable bottom barrier (120) may be a mesh or other permeable membrane, preferably with an underlying support structure.

With reference to FIG. 1F, in some embodiments, there is a spacer (125) between the water permeable bottom barrier (120) and the bottom end (110) of the bottom section along the interior wall (100) of the bottom section (101). The spacer (125) may be a part of the wall of the container may space the container from the surface on which the container its, to allow drainage. In some embodiments, the spacer (125) may include several apertures (FIG. 1F) (e.g., semi-circular shaped apertures) along the wall of the bottom section adjacent to the ground level. The apertures can have other shapes e.g. square, rectangular, conical, etc. The apertures (130) span the thickness of the spacer as shown in FIG. 1F.

In some embodiments, the apertures allow for the ejection of liquids and/or gas escaping by, for example, gravitational pull from the internal space (155) of the bottom section (101) through holes in the water permeable bottom barrier (120). In some embodiments, the apertures allow the ejection of liquid and/or gas even when the container system is placed on a flat surface.

In some embodiments, the external wall (105) of the cylindrical bottom section (FIG. 1B) has a slot (135) that allows access to the internal space (155) within the bottom section (101). The slot (135) can fit a removable water permeable barrier, which is discussed further with reference to FIGS. 2A-2C.

Figure 2A:
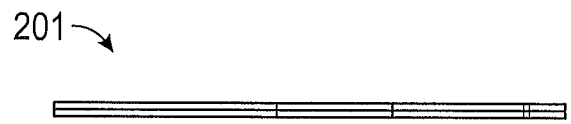
FIGS. 2A-2C show various views of an example of a removable water permeable barrier for the bottom section of FIGS. 1A-1F.
Figure 2B:
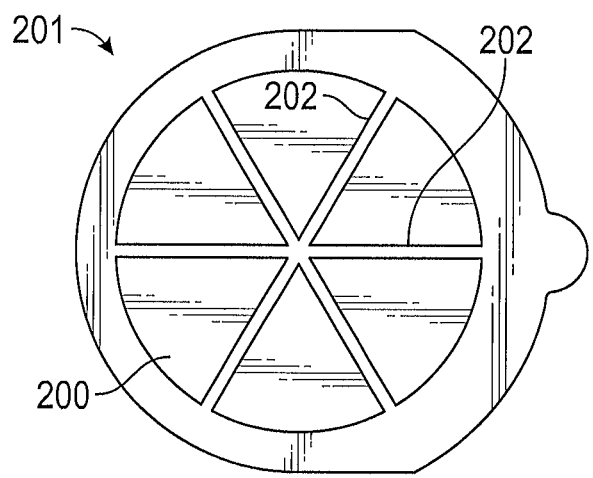
Figure 2C:
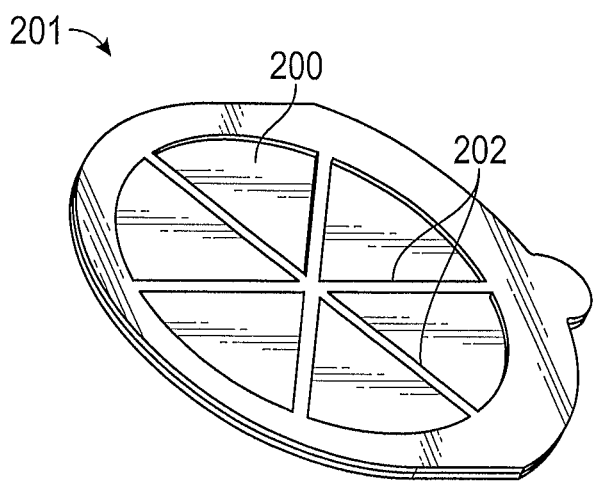
Figure 3A:
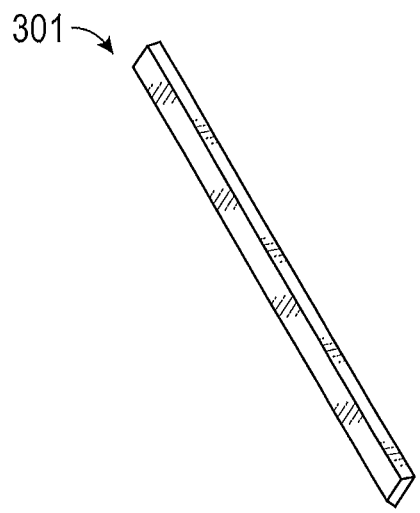
FIGS. 3A-3D show various views of an example of a locking rail for supporting the middle section of the container system.
Figure 3B:
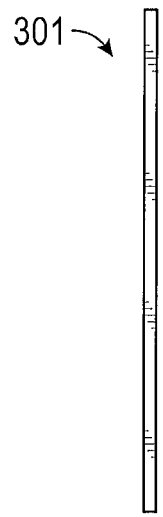
Figure 3C:
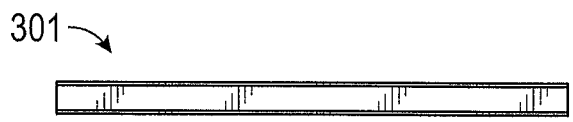
Figure 3D:
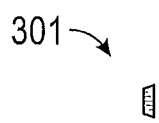

With reference now to FIGS. 2A-2C and FIGS. 1A-1F, various views of an example of a removable water permeable barrier (201) for the bottom section 101 of FIGS. 1A-1F are illustrated. FIG. 2A illustrates a side view of the removable water permeable barrier (201). FIG. 2B illustrates a top view of the removable water permeable barrier (201). FIG. 2C illustrates perspective view, looking downwards, of the removable water permeable barrier (201).

The removable water permeable barrier (201) functions as a removable partition for the bottom section (201). The removable water permeable barrier (201) may be inserted within the slot (FIG. 1E; 135) and may be further supported within the slot by support bridges (FIG. 1E; 165). The removable water permeable barrier (201) allows liquids to pass through the internal space (155) of the bottom section (101), while preventing solid structures, such as roots, from passing through. In some embodiments, the removable water permeable barrier (201) may be a solid plate having a plurality of holes (not shown). For example, the removable water permeable barrier (201) may be perforated with round holes. The holes can have other shapes such as triangular, square, pentagonal, hexagonal, etc. Preferably, in some other embodiments, the illustrated water permeable barrier (201) may comprise and support a water permeable membrane (not shown), which may take the form of a sheet, and which reduces the likelihood of roots growing into and becoming tangled in the barrier (201), as may occur if holes were present in that barrier.

The removable water permeable barrier (201) controls the expanding roots of the plant via limitation of volume and is preferably removable from the bottom section (101). Thus, the removable water permeable barrier (201) can control the growth of a root that either grows too quickly or too much or both via limitation of the volume of the internal space (FIG. 1B; 155) of the bottom section (101). Because the removable water permeable barrier (201) limits root growth within the internal space (155) of the bottom section (101), the relatively small volume occupied by the confined roots within the internal space (155) allows the plant along with its roots to be more easily transplanted to another location, for example, for planting in another pot or the ground. For example, the removable water permeable barrier (201) allows a plant to be transplanted during vegetative growth from one location and allowed to transition into reproductive growth at another location. In some embodiments, the removable water permeable barrier (201) may be reusable.

As noted above, the removable water permeable barrier (201) may be inserted into the slot (FIG. 1B; 135) to form an additional barrier across the internal space (155). In some embodiments, the bottom section has more than one slot that can fit multiple additional water permeable barriers.

In some embodiments, the removable water permeable barrier (201) is configured to control the growth of the root and may be configured to constrain and control root growth in multiple stages. For example, a container system can have one slot (FIG. 1B; 135) which can receive one removable water permeable barrier (201) for the bottom section (FIGS. 1A-1F; 101) thus dividing the internal space (155) into an upper half (FIG. 1E; 170) and a lower half (FIG. 1E; 171). As the roots grow from the top end (115) down into the internal space (155), the roots will first fill upper half (170) of the internal space (155). However, their growth will be restricted and contained within the upper half of the internal space (155) by the removable water permeable barrier (201). Once the root growth is bound via limitation of growth within the upper half (170) of the internal space (155) by the removable water permeable barrier (FIGS. 2A-2C; 201), removable water permeable barrier (201) can be removed thus providing more room to allow the roots to grow further into the lower half of the internal space (155).

In some embodiments, by dividing the internal space (155), the removable water permeable barrier (FIGS. 2A-2C; 201) allows control of the amount of soil, compost, manure or a combination thereof to be used for the growth of the plant enhancing efficiency and reducing wastage. In some embodiments, the growth medium in the lower half (171) of the internal space (155) may have a composition different than the growth medium in the upper half (170) to, for example, allow the medium to be tailored for different stages of growth and/or to encourage different growth behavior when the removable water permeable barrier (FIGS. 2A-2C; 201) is removed.

In some embodiments, the removable water permeable barrier (FIGS. 2A-2C; 201) can have two or more segments (200). In some embodiments, each segment direct the growth of a root system down into the bottom section (FIGS. 1A-1F 101). In addition, in some embodiments, the extensions (202) between the openings (200) may be used to support a water permeable membrane (e.g., a sheet laid over the extensions (202)) for partitioning the internal space (155).

In some embodiments, the external wall (FIG. 1B; 105) of the top end (FIG. 1B; 115) has a horizontal threading (FIG. 1B; 160). In some embodiments, the horizontal threading (FIG. 1B; 160) allows a horizontal threading (FIG. 5C; 515) in the base part (FIG. 5B; 500) of a middle section (FIGS. 5A-5D; 501) to be reversibly screwed thereto enabling the top end (FIG. 1B; 115) of the bottom section (FIGS. 1A-1F 101) to attach to the base part (FIG. 5B; 500) of the middle section (FIGS. 5A-5D; 501).

Middle Section

Figure 5A:
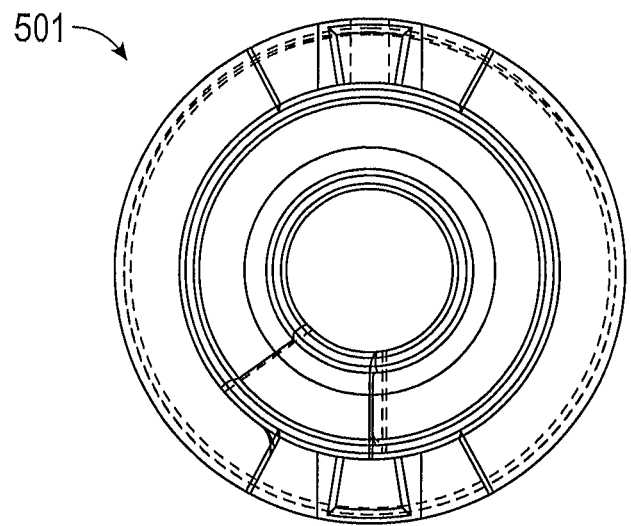
FIGS. 5A-5D show various views of an example of the middle section of a container system for controlling stem growth.
Figure 5B:
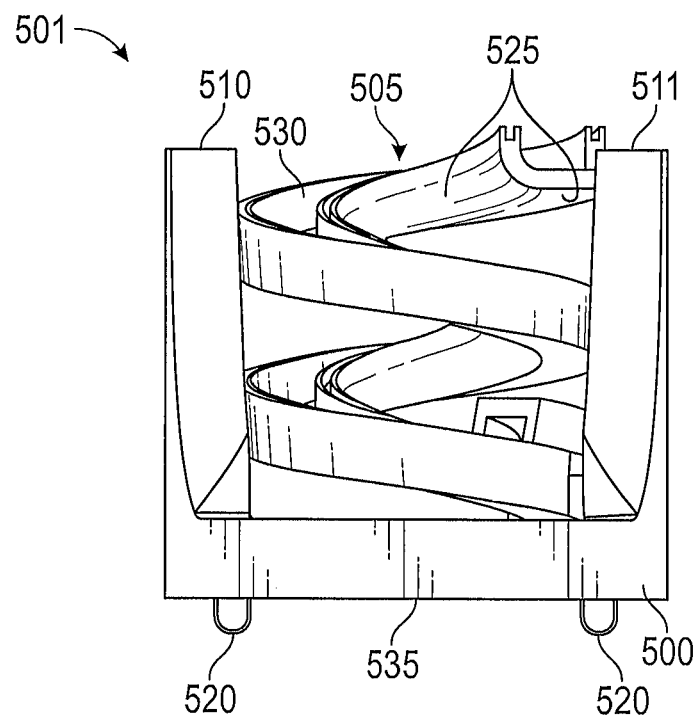
Figure 5C:
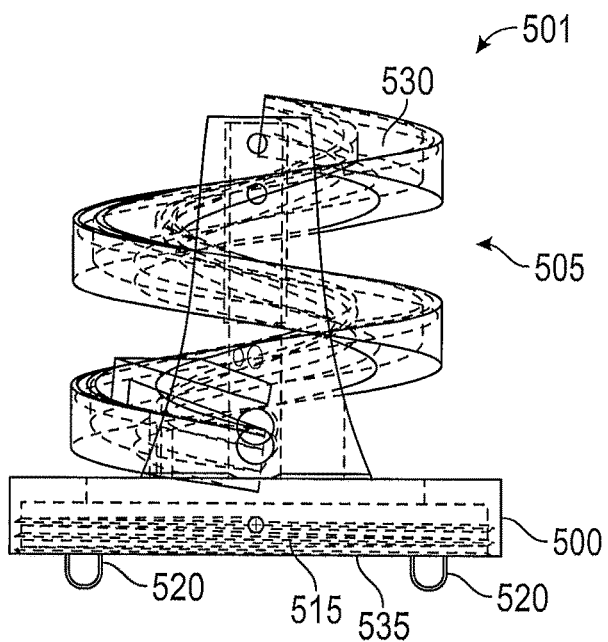
Figure 5D:
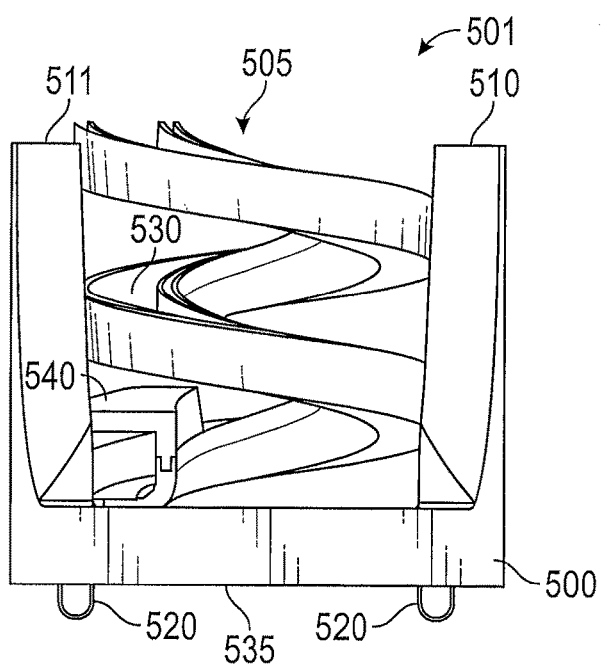

With reference to FIGS. 5A-5D, the middle section (501) may be used to control the growth of a stem portion of one or more plants. In some embodiments the middle section can control the shoot of the plant as it begins to grow into a stem. FIGS. 5A-5D show illustrations of several views of an embodiment of the middle section (501) for controlling stem growth. FIG. 5A illustrates a top view of the middle section (501). FIGS. 5B-5D illustrate side views of the middle section (501). FIG. 5C shows a transparent view showing internal details of the middle section (501).

The middle section (FIGS. 5A-5D; 501) can be attached to the top end (FIG. 1B; 115) of the bottom section (101). For example, the middle section can be screwed on, latched on, clipped on, snapped on, glued, or otherwise secured to the top end (115). In some embodiments, the middle section (FIGS. 5A-5D; 501) has threading (FIG. 5C; 515) that allows the middle section to be screwed to matching threading (FIG. 1B, 160) in the bottom section (FIGS. 1A-1F 101). This structure allows for simultaneous control of growth of the stem portion of a plant by the middle section (FIGS. 5A-5D; 501) and the root by the bottom section (FIGS. 1A-1F 101).

In some embodiments, the middle section (FIGS. 5A-5D; 501) has a base part (FIGS. 5B-5D; 500), a spiral part (FIGS. 5B-5D; 505), and at least two vertical supports (a first vertical support (FIG. 5B; 510) and a second vertical support (FIG. 5B; 511) that extend away vertically from the base part towards the top section (FIGS. 4C-4F; 401). In some embodiments, the base part (FIGS. 5B-5D; 500) can be cylindrical with a hollow internal space (not illustrated) and comprise an external wall (not illustrated) and an internal wall (not illustrated).

In some embodiments, the internal wall (not illustrated) of the base part (FIGS. 5B-5D; 500) has a threading (FIG. 5C; 515) that allows the middle section (FIGS. 5A-5D; 501) to be screwed onto a matching threading (FIG. 1B; 160) at the top end (FIGS. 1A-1F 115) of the external wall (FIGS. 1A-1F 105) of the bottom section (FIG. 1; 101). In some embodiments, the base part (FIGS. 5B-5D; 500) of the middle section (FIGS. 5A-5D; 501) can have other shapes. The base part (FIGS. 5B-5D; 500) of the middle section (FIGS. 5A-5D; 501) has preferably the same shape as the top end (FIGS. 1A-1F 115) of the bottom section (FIGS. 1A-1F 101) such that the base part (FIGS. 5B-5D; 500) of the middle section (FIGS. 5A-5D; 501) can be conveniently attached to the top end (FIGS. 1A-1F 115) of the bottom section (FIGS. 1A-1F 101). In some embodiments, there are two holes that are opposite from one another between the vertical threading of the middle section. In some embodiments, the two holes receive hooks and/or clips that enable the drying plant to be hung.

In some embodiments, when the container system is placed on a flat surface, the spiral part (FIGS. 5B-5D; 505) sits atop the base part (FIGS. 5B-5D; 500) of the middle section (FIGS. 5A-5D; 501). In some embodiments, the spiral part (FIGS. 5B-5D; 505) extends upwards and away from the base part (FIGS. 5B-5D; 500).

In some embodiments, the spiral part has removable wall pieces (FIG. 5B; 525) that hold together via a bonding mechanism. In some embodiments, the spiral part (FIGS. 5B-5D; 505) has removable wall pieces that hold together via one or more bonding mechanisms disclosed herein. In some embodiments, the spiral part (FIGS. 5B-5D; 505) has removable wall pieces (FIG. 5E; 540) that can be assembled to form a lid for the spiral part (FIGS. 5B-5D; 505). In some embodiments, the wall pieces may be attached to the spiral part and/or to each other by a bonding mechanism. The bonding mechanism may be, for example, one or more of click and lock, velcro, magnets, drop and stop, tape, glue, or other chemical adhesives. In some embodiments, the removable wall pieces (FIG. 5B; 525) can be held together to form a hollow spiral tunnel (FIGS. 5B-5D; 530) that extends upwards and away from the base part (FIGS. 5B-5D; 500) of the middle section (FIGS. 5A-5D; 501) towards the top section FIGS. 4C-4F; 401). Additional wall pieces can be added or removed to form a hollow tunnel of a desired length.

In some embodiments, the spiral part (FIGS. 5B-5D; 505) forces and/or allows one or more stems of a plant to grow as a spiral within the hollow spiral tunnel (FIGS. 5B-5D; 530). In some embodiments, the middle section (FIGS. 5A-5D; 501) is configured to manipulate growth of a stock/vine/stem/stalk portion of one or more plant varieties in an upward spiral direction. Advantageously, this can make the plant more compact by reducing the height of the plant. Although illustrated as a spiral, the spiral part may have other shapes that allow the stem to grow in an extended fashion in a predetermined amount of vertical space.

In some embodiments, the spiral part prevents a stem inside it from being exposed to light or reduces exposure of the stem to light (e.g, sunlight or artificial light). As a consequence, the stem has reduced vegetation such as leaves, flowers, buds, fruit branches etc . . . , and in some embodiments is substantially devoid of additional vegetation. In some embodiments, the removable wall pieces (FIG. 5B; 525) of the spiral part (FIGS. 5B-5D; 505) can be removed and the stem can be exposed to light (e.g, sunlight or artificial light) and therefore the stem may grow additional vegetation such as leaves, flowers, fruits, buds, branches, etc.

In some embodiments, one or more scions can be inserted into the spiral part (FIGS. 5B-5D; 505) of the middle section (FIGS. 5A-5D; 501). The growth medium for a scion can be provided in the form of a growth medium cube at a grafting end of the scion. The grafting end of a scion along with its growth medium cube can be grafted onto a grafting end of a stock plant.

As discussed herein, in some embodiments, the spiral part (FIGS. 5B-5D; 505) is configured to control exposure of a stem to light (e.g, sunlight or artificial light). Depriving the stem of light greatly reduces external vegetative and reproductive growth on the stem. For example, light deprivation of a stem can greatly reduce the growth of leaves, flowers, fruits, buds or a combination thereof on the stem. In some embodiments, the spiral part (FIGS. 5B-5D; 505) can guide the shape of the stem along a spiral route. The growth of the stem with a spiral shape allows the stem of the plant to be compacted, for example, like a spring or a coil. In some embodiments, the spiral part (FIGS. 5B-5D; 505) provides weight management support for the plant. In some embodiment, the growth of the stem with a spiral shape allows even weight distribution along the stem.

In some embodiments, the middle section (FIGS. 5A-5D; 501) can have cover pieces (540) that can fit on top of the spiral part (FIGS. 5B-5D; 505). In some embodiments, additional cover pieces can be added as the stem grows along the spiral part such that the stem remains covered. The spiral pieces can be of different sizes to cover different lengths of the spiral part.

In some embodiments, the spiral part is bounded peripherally by the two vertical supports (510 and 511), as shown for example in FIGS. 5B and 5D. In some embodiments, each vertical support (510 and 511) has a vertical cavity (not illustrated) that faces the spiral part (FIGS. 5B-5D; 505).

In some embodiments, there is an attachment piece (not illustrated) near the base part (FIGS. 5B-5D; 500) of the middle section (FIGS. 5A-5D; 501). The attachment piece can be used for injecting air, food, water, etc. In some embodiments, air can be pumped into the hollow spiral tunnel via the attachment piece using a fan, pump, pump line, etc.

In some embodiments of the middle section (FIGS. 5A-5D; 501), the bottom end (FIGS. 5B-5D; 535) of the base part (FIGS. 5B-5D; 500) has two or more clips and/or hooks (FIGS. 5B-5D; 520). The two or more clips and/or hooks are symmetrically placed along the bottom end (FIGS. 5B-5D; 535) of the base part (FIGS. 5B-5D; 500) of the middle section (FIGS. 5B-5D; 501). In some embodiments, the number of clips and/hooks is 2 (FIGS. 5B-5D; 520). In some embodiments, other numbers of clips and/hooks are also contemplated.

In some embodiments, the middle section can be hung upside down by the two or more clips and/or hooks (FIGS. 5B-5D; 520) to dry a plant. In some embodiments of a container including bottom, middle, and top sections that is used to control the growth of an entire plant, the middle section can be detached from the bottom section (FIGS. 1A-1F 101) and the top section (FIG. 4C-4F; 401). Thereafter, the root can be separated from the stem by, for example, cutting the base of the stem above the growing medium so that the stem can be hung upside down by two or more clips, hooks and/or ties (FIGS. 5B-5D; 520). Hanging the middle section (FIGS. 5A-5D; 501) in this manner allows the stem, flowers and/or leaves to be dried. In some embodiments the middle and top sections are together separated from the bottom section and the plant is hung up to dry by clips 520 on the middle section.

In some embodiments, the middle section can be detached from the bottom section (FIGS. 1A-1F; 101) (and, in some embodiments, also from the top section (FIG. 4C-4F; 401)). Thereafter, the root part can be separated from the stem and vegetative/reproductive parts by, for example, cutting the root part away, and the middle section (FIGS. 5A-5D; 501), comprising the stem with the vegetative/reproductive parts still attached to the stem, can be hung upside down by the two or more clips and/or hooks (FIGS. 5B-5D; 520). Hanging the middle section (FIGS. 5A-5D; 501) in this manner allows the stem and the vegetative/reproductive parts to be dried.

The vertical cavity (not illustrated) in each vertical support (FIGS. 5B and 5D; 510 and 511) of the middle section (FIGS. 5A-5D; 501) receives a locking rail as a locking mechanism for positioning the horizontal bars (FIG. 4; 400) of the top section. FIG. 6 shows illustrations of several views of an embodiment of a first locking rail (600) for supporting the top section. FIG. 6A illustrates a perspective view, looking downwards, of the first locking rail (600). FIG. 6B illustrates a top view of the first locking rail (600). FIG. 7 shows illustrations of several views of an embodiment of a second locking rail (700) for supporting the top section. FIG. 7B illustrates a top view of the second locking rail (700). FIG. 7C illustrates a perspective view, looking downwards, of the second locking rail (700).

In some embodiments, a locking rail for supporting the middle section can slide vertically within the vertical cavity of a vertical support. For example, in some embodiments, a first vertical support (FIGS. 5B and 5D; 510) has a first vertical cavity (not illustrated) which receives a first locking rail (FIG. 6; 600) and a second vertical support (FIGS. 5B and 5D; 511) has a second vertical cavity (not illustrated) which receives a second locking rail (FIG. 7; 700).

Top Section

The top section (FIGS. 4C-4F; 401) may be used to control the vegetative/reproductive growth of a plant. FIGS. 4C-4F show illustrations of several perspective views of an embodiment of the top section for controlling vegetative/reproductive growth. The vegetative/reproductive part grows from the vegetative/reproductive end of the stem that is opposite the root end of the stem. The vegetative/reproductive part grows on the part of the stem that is not covered by the spiral part (FIGS. 5B-5D; 505) of the middle section (FIGS. 5A-5D; 501). The vegetative/reproductive part can comprise branches comprising leaves, flowers, fruits, buds or a combination thereof.

In some embodiments, the locking rails (FIG. 6; 600 and FIG. 7; 700) allow the middle section (FIG. 4; 401) to be attached to the vertical supports (FIGS. 5B and 5D; 510 and 511). In some embodiments, if additional spiral pieces are to be used, the height of the locking rails for supporting the middle section can be adjusted accordingly by sliding them vertically within the vertical cavities (not illustrated) of the vertical supports (FIGS. 5B and 5D; 510 and 511). In some embodiments, the locking rails (FIG. 6; 600 and FIG. 7; 700) can be locked in place within the vertical cavities (not illustrated) at varying heights from the base part (FIGS. 5B-5D; 500) of the middle section (FIGS. 5A-5D; 501).

In some embodiments, to grow the stem to a greater height with encouraging the growth of vegetative/reproductive plant parts on the stem, additional spiral pieces can be used and the height of the locking rails (FIG. 6; 600 and FIG. 7; 700) may also be adjusted to accommodate the additional spiral pieces or plant height. It will be appreciated that the height of the stem, without vegetative/reproductive growths, and the height of the portion of the stem with vegetative/reproductive growths can be adjusted using the spiral pieces. In some embodiments, when it is desirable selectively grow the vegetative/reproductive part to a greater height, the locking rails (FIG. 6; 600 and FIG. 7; 700) can be locked at varying heights without using additional spiral pieces. In some other embodiments, to grow the stem to a greater height as well as control the height of the vegetative/reproductive part (e.g., branches with flowers, fruits, buds, leaves or a combination thereof) and to grow the vegetative/reproductive part to a greater height as well, additional spiral pieces can be used in combination with adjusting the height of the locking rails (FIG. 6; 600 and FIG. 7; 700).

In some embodiments, the top section comprises, in addition to the locking rails (FIG. 6; 600 and FIG. 7; 700), two or more horizontal bars (FIGS. 4C-4F; 400). The two or more horizontal bars (FIGS. 4C-4F; 400) bridge the opposing locking rails (FIG. 6; 600 and FIG. 7; 700). In some embodiments, the number of horizontal bars (FIGS. 4C-4F; 400) can be 2 or more.

Figure 4A:
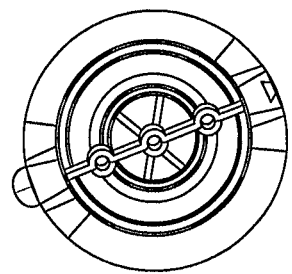
Figure 4B:
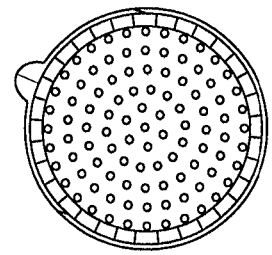
Figure 4C:
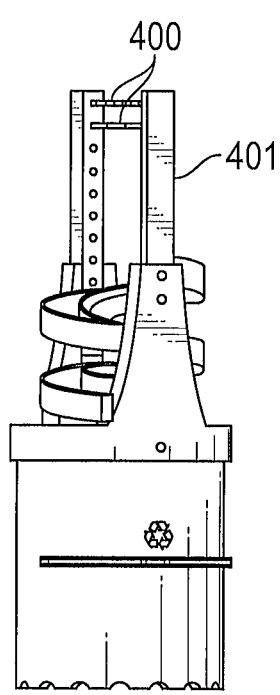
Figure 4D:
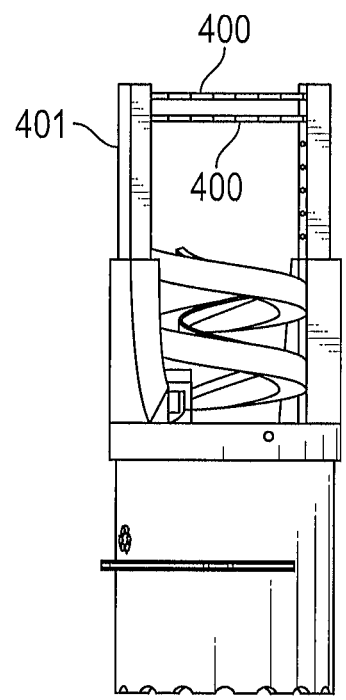
Figure 5E:
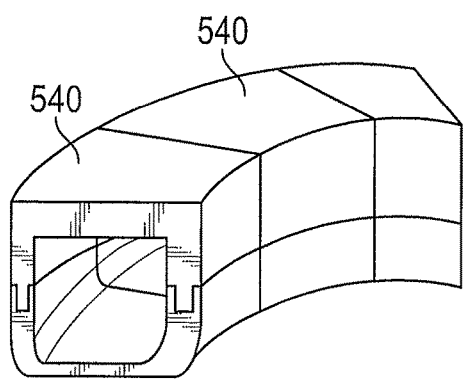
FIG. 5E shows a non-limiting embodiment of a portion of a spiral part of the middle section of a container system.

FIGS. 8A-8D show illustrations of several views of an embodiment of a horizontal bar. In some embodiments, each horizontal bar (FIG. 8; 800) has one or more restraints (FIG. 8A-8C; 805) for plant stems. In some embodiments, the one or more restraints (FIG. 8A-8C; 805) for plant stems are ring shaped. In some embodiments, the one or more restraints for plant stems can have other shapes such as square, rectangular, etc. In some embodiments, a ring shaped restraint for plant stems comprises a female half (FIG. 8A-8C; 805) that is part of the horizontal bar (FIG. 8; 800). In some embodiments, the ring shaped restraints for plant stems is assembled when the female half (FIG. 8A-8C; 805) of a ring shaped restraint for plant stems receives a male half, several views of which are illustrated in FIGS. 9A-9D; 900. Several assembled ring shaped restraints for plant stems comprising both the female half (FIG. 8A-8C; 805) and the male half (FIGS. 9A-9D; 900) are illustrated as feature 405 in FIG. 4F. The female half (FIG. 8A-8C; 805) of the ring shaped restraint for plant stems receives a male half (FIGS. 9A-9D; 900) of the ring shaped restraint in a click and lock mechanism comprising a female structure (FIGS. 8A and 8B; 820) on the female half (FIG. 8A-8C; 805) of the restraint (FIG. 4F; 405) and a male structure (FIGS. 9A and 9C; 905) on the male half (FIGS. 9A-9D; 900) of the restraint (FIG. 4F; 405). In some embodiments, the placement of the male half (FIGS. 9A-9D; 900) and the female half (FIG. 8A-8C; 805) can be reversed. In some embodiments, the male half (FIGS. 9A-9D; 900) and the female half (FIG. 8A-8C; 805) can attach together by other meals, for example, via adhesives, screws, bindings, etc.

One or more stems or branches comprising the vegetative/reproductive components (e.g., leaves, buds, flowers and fruits) are guided through the one or more restraints (FIG. 4F; 405) of a horizontal bar (FIG. 4C-4F; 400). Each restraint (FIG. 4F; 405) can guide one or more stems or branches.

FIGS. 4G-4J illustrate top views of non-limiting embodiments of horizontal bars and restraints of a container system. In some embodiments, each horizontal bar (FIG. 4F; 400) has at least 3 restraints (FIG. 4F, 405). In some embodiments, the horizontal bar can have either less or more than 3 restraints. In some embodiments of the horizontal bar (FIG. 4G), the restraints are evenly spaced along the length of the horizontal bar and have the same size (FIG. 4G; 405). In some embodiments of the horizontal bar (FIG. 4H), the restraints are unevenly spaced along the length of the horizontal bar and have different sizes (FIG. 4H; 405). In some embodiments of the horizontal bar (FIG. 4I), the restraints are unevenly spaced along the length of the horizontal bar and have the same size (FIG. 4I; 405). In some embodiments of the horizontal bar (FIG. 4J), the restraints are evenly spaced along the length of the horizontal bar and have different sizes (FIG. 4J; 405).

Figure 8A:
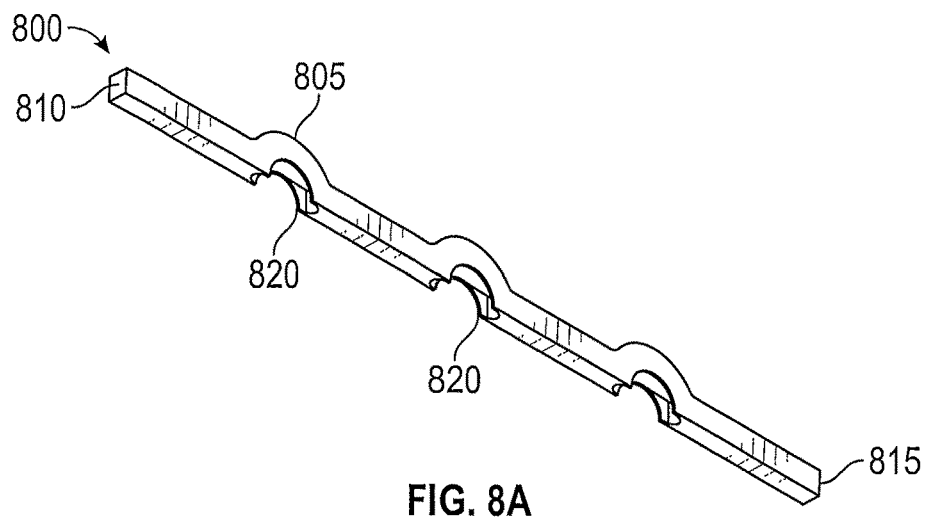
FIGS. 8A-8D shows various views of an example of the top section of the container system with a female half of a restraint for plant stems.
Figure 8B:
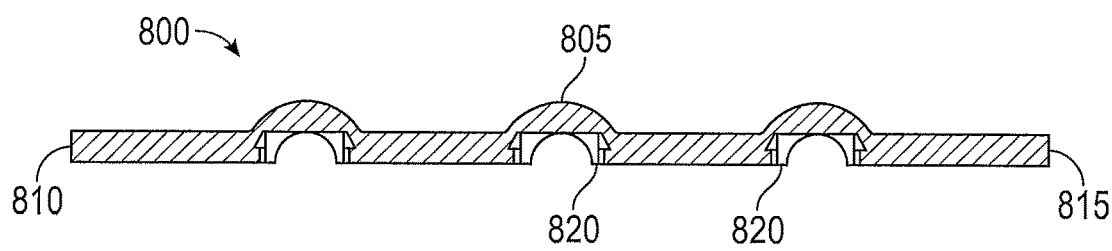
Figure 8C:
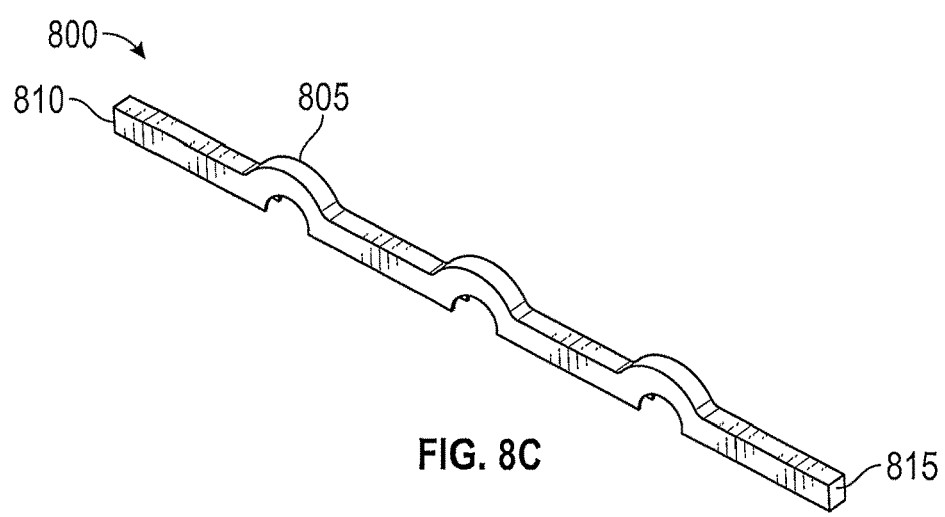
Figure 8D:
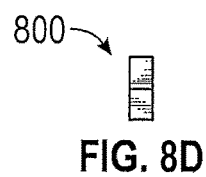
Figure 9A:
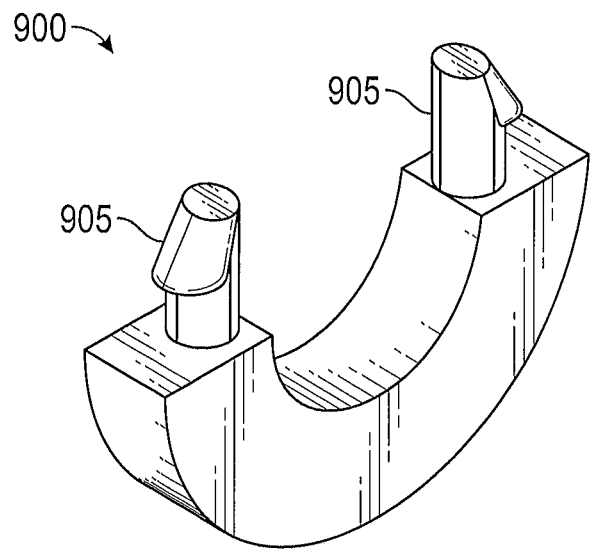
FIGS. 9A-9D shows various views of an example of a male half of a restraint for plant stems.
Figure 9B:
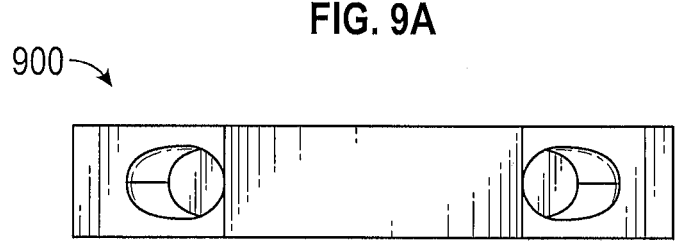
Figures 9C, 9D:
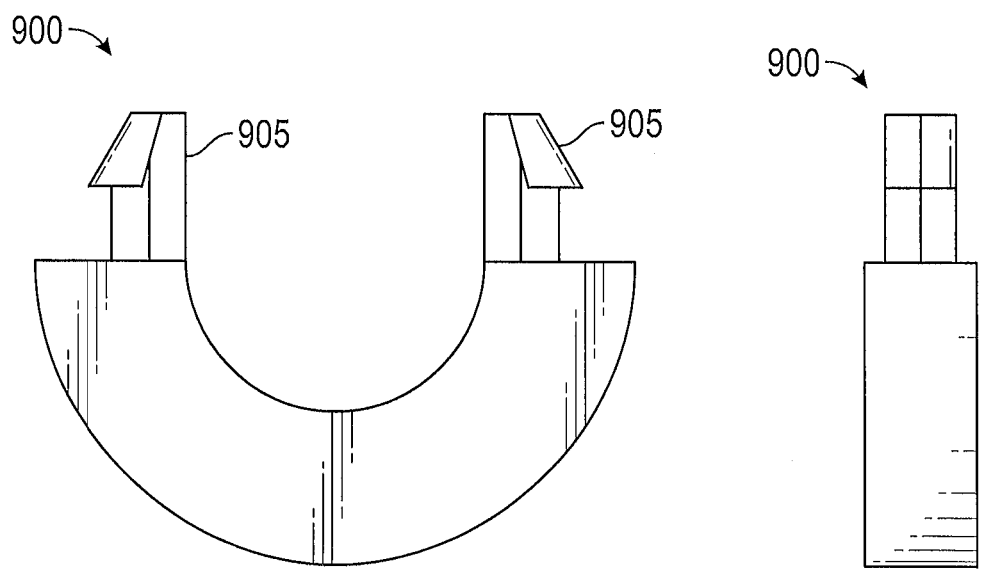

Each locking rail (FIG. 6A; 600 and FIG. 7C; 700) of the top section (FIG. 4C-4F; 401) has several cavities (FIGS. 6A, 6C and 6D; 605 and FIGS. 7A, 7C and 7D; 705) that are evenly distributed along the length of each locking rail. In some embodiments, the cavities do not need to be evenly distributed. In some embodiments, the cavities should not be evenly distributed. Each horizontal bar (FIG. 8; 800) of the top section (FIG. 4C-4F; 401) has a first end (FIGS. 8A-8C; 810) and a second end (FIGS. 8A-8C; 815). The first end (FIGS. 8A-8C; 810) of a horizontal bar (FIG. 8; 800) fits into a cavity (FIGS. 6A, 6C and 6D; 605) of the first locking rail (FIG. 6A; 600) and the second end (FIGS. 8A-8C; 815) of a horizontal bar (FIG. 8; 800) fits into a cavity (FIGS. 7A, 7C and 7D; 705) of the second locking (FIG. 7C; 700). Thus, a horizontal bar is held in place horizontally by the opposing locking rails and the height of the one or more horizontal bars may be adjusted by adjusting the position of the one or more horizontal bars along the length of the first and second locking rails. Additional locking rails for supporting the middle section can be added on top of the first and second locking rails for supporting the middle section by one or more attachment mechanisms such as adhesives, screwing, binding, etc. as the plant grows or if additional growth of the plant is desired. The horizontal bars can provide directional growth support. It will be appreciated that multiple horizontal bars (FIG. 8; 800) can be utilized to distribute support for a stem or branch over multiple vertical levels.

In some embodiments, the one or more restraints (FIG. 4F; 405) for plant stems is configured to redirect one or more branches that stray away from a stem of a plant at the top end of the stem, wherein the one or more branches comprise the vegetative/reproductive part comprising leaves, flowers, fruits, buds or a combination thereof. In some embodiments, the restraints for plant stems additionally provide weight management support for the plant.

Controlling Plant Growth

In some embodiments, a container for manipulating the growth of a plant for achieving controlled and customized growth of the plant is provided. For example, using one or more embodiments of the container system disclosed herein, controlled growth of a stock/vine/stem/stalk portion of one or more plant varieties in an upward spiral direction can be achieved. Also, using one or more embodiments of the container system disclosed herein, controlled growth of a root portion of one or more plant varieties can be achieved. In addition, using one or more embodiments of the container system disclosed herein, controlled growth of a vegetative/reproductive part (comprising branches with leaves, buds, flowers, fruits, etc.) of one or more plant varieties can be achieved. In some embodiments, the control grow of multiple portions of the plant may be achieved.

In some embodiments, methods for growing plants using one or more embodiments of the container systems disclosed herein are provided. In some embodiments, the methods can be used to control the growth of a stock/vine/stem/stalk portion of one or more plant varieties in an upward spiral direction. Also, method for using one or more embodiments of the container system disclosed herein for controlled growth of a root portion of one or more plant varieties is provided. In addition, method for using one or more embodiments of the container system disclosed herein for controlled growth of a vegetative/reproductive part (comprising branches with leaves, buds, flowers, fruits, etc.) of one or more plant varieties is provided.

As noted herein, a plant whose growth is to be controlled has a root part, a stem part and a vegetative/reproductive part. In some embodiments, the growth of the root part is controlled by the bottom section (FIGS. 1A-1F 101), the stem part by the middle section (FIGS. 5A-5D; 501), and the vegetative/reproductive part by the top section (FIGS. 4C-4F; 401). The root and stem parts are concealed within different sections of the container system. In contrast, the vegetative and reproductive parts may be exposed.

Growing plants in a controlled environment and within a limited volume has the advantages of conserving the resources (e.g., water, soil, space, light, etc.) expended, exerting more control over the growth properties and outcomes, and facilitating subsequent processing such as storage, packaging, shipment, etc. of the plants. Other advantages include harnessing ornamental and medicinal benefits that might otherwise be unavailable.

For example, the growth of the root part can be controlled via limitation of volume within the internal space (FIG. 1B; 155) of the bottom section (FIGS. 1A-1F 101) using one or more removable water permeable barriers (FIGS. 2A-2C; 201) that can be removed to provide more room to allow the root part to grow further into the internal space (FIG. 1B; 155) of the bottom section (FIGS. 1A-1F 101).

Another example is grafting the scion of a first plant variety onto the stock of a second plant variety within the spiral part (FIGS. 5A-5D; 505), whereby one may be able to generate a hybrid plant whose properties are combination of the properties of the first and second plant varieties and may be superior aesthetically and/or medicinally to the properties of the first and second plant varieties.

Various embodiments disclosed herein can be used for controlled growth of plants in general. The plant can be a flowering plant whose growth is to be controlled for an ornamental purpose. The plant can be a medicinal plant (e.g., cannabis) whose growth is to be controlled to better harness medical benefits, for example by providing a healthier plant and/or a plant that produces a greater amount of a desired product. For example, the plant whose growth is controlled are less stressed that plants whose growth is controlled by other current systems used in the growth phase, thereby producing a better product. Thus, for example, using some embodiments, one can control plant growth by inserting one or more scions and their growth medium cube within the spiral part (FIGS. 5A-5D; 505) of the middle section (FIGS. 5A-5D; 501) such that the scion from one plant variety is grafted on a stock from another plant variety.

In terms of conserving the resources expended, using some embodiments of the container systems disclosed herein, plant growth can be controlled by light deprivation in a part of the plant. Due to light deprivation, external growth is prevented on that part of the plant. For example, the stem part can be shielded from a light source by concealing the stem part within the spiral part (FIGS. 5A-5D; 505) of the middle section (FIGS. 5A-5D; 501). Therefore, the concealed stem has no or minimal vegetative/reproductive growth on it. For example, in some embodiments, there are no/minimal leaves, buds, flowers and/or fruits on the stem that is concealed within the spiral part (FIGS. 5A-5D; 505) of the middle section (FIGS. 5A-5D; 501).

However, the concealed stem part can be fed minimal nutrients. For example, in some embodiments, there is an attachment piece for the injection of air via a fan, a pump, a pump line, or a combination thereof near the base of the spiral container system. Thus, in some embodiments, minimal growth can be achieved by injecting air via a fan and/or a pump within the spiral part of the middle section. Growth can also be controlled by effectively, and with less effort than a standard top feed process, injecting other essentially nutrients such as water, food, etc. This, the container systems according to some embodiments disclosed herein allow for controlling plant growth without the plant investing more energy than is necessary in the stem part that is concealed.

In some embodiments, only the part of the stem that receives light has vegetative/reproductive growth. Thus, a large portion of the energy of the plant is invested in the vegetative/reproductive part at the top end of the stem that is not concealed within the spiral part (FIGS. 5A-5D; 505) of the middle section (FIGS. 5A-5D; 501). For example, the top end of stem that is not concealed has vegetative/reproductive growth such as leaves, buds, flowers, fruits or a combination thereof.

In some instances storage and transportation of plants are important considerations. For example, in some instances, it is desirable to have a compact shape and size for the plant for ease of packaging and handling. In some embodiments, growth can be controlled using the embodiments of the container systems disclosed herein, by guiding the shape of the stem along a predetermined spiral path and the stem part is grown in a spiral shape. In some embodiments, guiding the shape of the stem along a predetermined spiral path allows the stem to be grown like a coil or a spring. Because of the spiral shape, in some embodiments, the stem part of the plant can be compacted like a coil or spring, if required. This enables the stem to be compacted and thus takes up less space compared to a non-spiral regular stem. The spiral shape of a stem also offers decorative and aesthetic benefits as well as weight management support for the plant.

In some embodiments, the middle section (FIGS. 5A-5D; 501) has hooks and/or clips that allow the middle section (FIGS. 5A-5D; 501) to be hung upside down to dry a plant. In some embodiments the middle section and the top section are hung upside down together. Drying by hanging allows the plant to be compacted for easy transportation and long-term storage.

In some embodiments, the container system can be used to control the growth of a plant with multiple vegetative/reproductive parts, wherein each vegetative/reproductive part is a separate branch and each branch is guided through one restraint (FIGS. 4C-4F; 405).

In some embodiments, the restraints for plant stems in the top section (FIGS. 4C-4F; 401) are configured to redirect one or more branches that stray away at the top end of the stem. The restraints (FIG. 4F; 405) for plant stems operate by a click and lock mechanism that holds the branches of the stem in place. In some embodiments, the click and lock mechanism of the restraint (FIG. 4F; 405) operates when a female half (FIGS. 8A-8C; 805) of the restraint (FIG. 4F; 405) receives a male half (FIGS. 9A and 9C; 905) of the restraint (FIG. 4F; 405). In some embodiments, if there are multiple branches emerging of a single stem, each restraint (FIG. 4F; 405) can guide either one or multiple branches. In some embodiments, the restraints (FIG. 4F; 405) can additionally provide weight management support for the entire stem, for example, when a stem has multiple branches.

In some embodiments, the growth of a plant can be controlled by transplantation of a plant at various stages of growth. For example, in some embodiments, a plant can be grown in its vegetative stage in a container according to one embodiment and can be transplanted to a container according to another embodiment for reproductive growth. Alternatively, a plant can be grown in its vegetative stage in a container according to one embodiment and can be transplanted to another place for growth of the plant (e.g., a pot or the ground) to allow the plant to transition to its reproductive stage.

Although various aspects of the apparatus and methods have been disclosed in the context of certain embodiments and examples, those skilled in the art will understand that the present disclosure extends beyond the specifically disclosed embodiments to other alternative embodiments and/or uses and obvious modifications and equivalents thereof. In addition, while several variations have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes or embodiments. Thus, it is intended that the scope should not be limited by the particular disclosed embodiments described above.

What is claimed is:

1. A container system configured to control the growth of a plant, the container system comprising:
   a bottom section configured to accommodate and control the growth of a root part of the plant;
   a middle section configured to accommodate and guide the growth of a stem part of the plant, wherein the middle section comprises a spiral part having a plurality of removable wall pieces that are bonded together to form a hollow spiral tunnel that is configured to guide the growth of the stem part along a spiral route in a spiral shape, and wherein the removable wall pieces shield the stem part of the plant from a light source; and
   a top section configured to guide the growth of a vegetative part, a reproductive part or both of the plant.

2. The container system of claim 1, wherein the bottom section has a cylindrical shape with an internal space.

3. The container system of claim 2, wherein the bottom section is configured to control the growth of the root part of the plant by limiting a volume available for the growth within the hollow internal space.

4. The container system of claim 1, wherein the light source is at least one of an artificial light source or a natural light source.

5. The container system of claim 1, wherein the top section is comprised of one or more restraints for plant stems, wherein the one or more restraints guide the growth of the vegetative part, the reproductive part or both of the plant, wherein the vegetative part comprises leaves, and the reproductive part comprises buds, flowers, fruits or a combination thereof.

6. A method of growing a plant, the method comprising:
providing a container system according to claim 1, wherein the bottom section comprises a removable water permeable barrier partitioning the bottom section into at least two volumes;
growing the root part within a first of the two volumes for a first duration of time;
removing the removable water permeable barrier after the first duration of time; and
subsequently growing the root part within the bottom section for a second duration of time.

7. The method of claim 6, wherein the container system further comprises a middle section comprising a spiral tunnel, wherein the method further comprises growing a stem part of the plant within the spiral tunnel.

8. The method of claim 7, further comprising extending a length of the spiral tunnel as the stem grows.

9. The method of claim 6, wherein the container system further comprises a top section comprising one or more restraints for plant stems, the method further comprising supporting the plant stems with the one or more restraints.

10. The method of claim 6, wherein the plant is an ornamental plant.

11. The method of claim 10, wherein the ornamental plant is a flowering plant.

12. The method of claim 6, wherein the plant is a medicinal plant.

13. The method of claim 12, wherein the medicinal plant is *cannabis*.

* * * * *